US009525910B2

(12) United States Patent
Lee et al.

(10) Patent No.: US 9,525,910 B2
(45) Date of Patent: Dec. 20, 2016

(54) DISPLAY APPARATUS AND CHANNEL MAP MANAGING METHOD THEREOF

(71) Applicant: SAMSUNG ELECTRONICS CO., LTD., Suwon-si (KR)

(72) Inventors: Sang-wook Lee, Seoul (KR); Chang-won Kim, Gwangju-si (KR); Young-chun Ahn, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 39 days.

(21) Appl. No.: 14/586,010

(22) Filed: Dec. 30, 2014

(65) Prior Publication Data

US 2015/0189372 A1  Jul. 2, 2015

(30) Foreign Application Priority Data

Dec. 30, 2013  (KR) .................. 10-2013-0167436

(51) Int. Cl.
*G06F 3/00* (2006.01)
*H04N 21/438* (2011.01)
(Continued)

(52) U.S. Cl.
CPC ...... *H04N 21/4383* (2013.01); *H04N 21/4345* (2013.01); *H04N 21/44222* (2013.01);
(Continued)

(58) Field of Classification Search
CPC ............ H04N 21/4383; H04N 21/4345; H04N 21/44222; H04N 21/4532; H04N 21/4586; H04N 21/4667; H04N 21/4823; H04N 21/4524
(Continued)

(56) References Cited

U.S. PATENT DOCUMENTS 6,351,566 B1  2/2002  Zlotnick
6,442,757 B1 *  8/2002  Hancock ............ H04N 5/44513
                                                      348/E5.097
(Continued)

FOREIGN PATENT DOCUMENTS

JP   2005-084157 A   3/2005
JP   2008-097588 A   4/2008
(Continued)

OTHER PUBLICATIONS

Written Opinion issued on Feb. 16, 2015 by the International Searching Authority in related Application No. PCT/KR2014/011993.

(Continued)

*Primary Examiner* — Nathan Flynn
*Assistant Examiner* — Alfonso Castro
(74) *Attorney, Agent, or Firm* — Sughrue Mion, PLLC

(57) ABSTRACT

A display apparatus includes a storage configured to store a recommendation channel map including a plurality of channel numbers and channel information mapped to channel numbers; an input unit for inputting a user command and selecting a channel; a contents receiver configured to receive contents through a channel corresponding to the user command; a display configured to display the contents; and a controller configured to compare the stored channel information mapped to the selected channel number in the recommendation channel map and channel information of the received contents, and to update the recommendation channel map according to a result of comparison.

17 Claims, 17 Drawing Sheets

(51) Int. Cl.
*H04N 21/434* (2011.01)
*H04N 21/466* (2011.01)
*H04N 21/442* (2011.01)
*H04N 21/45* (2011.01)
*H04N 21/458* (2011.01)
*H04N 21/482* (2011.01)

(52) U.S. Cl.
CPC ..... *H04N 21/4532* (2013.01); *H04N 21/4586* (2013.01); *H04N 21/4667* (2013.01); *H04N 21/4823* (2013.01); *H04N 21/4524* (2013.01)

(58) Field of Classification Search
USPC .......................................................... 725/56
See application file for complete search history.

(56) References Cited

U.S. PATENT DOCUMENTS

| | | | |
|---|---|---|---|
| 7,499,588 | B2 | 3/2009 | Jacobs et al. |
| 8,139,862 | B2 | 3/2012 | Shimodaira |
| 9,204,189 | B1* | 12/2015 | Oztaskent .......... H04N 21/2407 |
| 2002/0131642 | A1* | 9/2002 | Lee ........................ G06K 9/325 382/220 |
| 2006/0008147 | A1* | 1/2006 | Jung .................... G06K 9/2054 382/176 |
| 2007/0204308 | A1 | 8/2007 | Nicholas et al. |
| 2010/0135526 | A1* | 6/2010 | Hayashi ................ G06T 1/0028 382/100 |
| 2010/0229197 | A1 | 9/2010 | Yi et al. |
| 2012/0084801 | A1* | 4/2012 | Rowe ................... H04N 21/252 725/14 |
| 2013/0007813 | A1 | 1/2013 | Baskaran et al. |
| 2014/0085541 | A1* | 3/2014 | Sandland ......... H04N 21/44008 348/570 |

FOREIGN PATENT DOCUMENTS

| | | |
|---|---|---|
| JP | 2012-065230 A | 3/2012 |
| KR | 10-2004-0079497 A | 9/2004 |
| KR | 10-2007-0040455 A | 4/2007 |
| KR | 10-0777298 B1 | 11/2007 |
| KR | 10-2008-0054032 A | 6/2008 |
| KR | 10-2008-0064595 A | 7/2008 |
| KR | 10-2010-0011187 A | 2/2010 |
| KR | 1020130090042 A | 8/2013 |

OTHER PUBLICATIONS

Search Report issued on Feb. 16, 2015 by the International Searching Authority in related Application No. PCT/KR2014/011993.
SeungGwan Lee et al., "Personalized DTV Program Recommendation System under a Cloud Computing Environment", IEEE Transactions on Consumer Electronics, vol. 56, No. 2, May 2010, total 9 pages.
Nobuyuki Otsu, "A threshold selection method from gray-level histograms", IEEE Transactions on Systems, MAN, and Cybernetics, vol. SMC-9, No. 1, pp. 62-66, Jan. 1979.
J. Sauvola, et al., "Adaptive document image binarization", Pattern Recognition, The Journal of the Pattern Recognition Society, 33 (2000), pp. 225-236.

* cited by examiner

FIG. 7

| 1 | AAA |
|---|-----|
| 3 | CCC |
| 4 | DDD |

FIG. 8

| 1 | AAA |
|---|-----|
| 2 | SSS |
| 3 | CCC |
| 4 | DDD |

FIG. 9

| 1 | AAA |
|---|-----|
| 5 | BBB |
| 3 | CCC |
| 4 | DDD |

FIG. 10

| 1 | AAA |
|---|-----|
| 2 | BBB |
| 3 | CCC |
| 4 | DDD |
| 5 | EEE |

FIG. 16

631 velocity    104-1

631 velocity

DISPLAY APPARATUS AND CHANNEL MAP MANAGING METHOD THEREOF

CROSS-REFERENCE TO RELATED APPLICATION

This application claims priority from Korean Patent Application No. 10-2013-0167436, filed in the Korean Intellectual Property Office on Dec. 30, 2013, the disclosure of which is incorporated herein by reference in its entirety.

BACKGROUND

1. Field

Methods and apparatuses consistent with exemplary embodiments relate to a display apparatus and a channel map managing method thereof, and more particularly, to a display apparatus capable of recognizing a displayed text and updating a channel map, and a channel map managing method thereof.

2. Description of the Related Art

In general, a set-top box (STB) is configured together with a (television) TV receiver to receive various TV image signals received from a contents providing server, etc. An STB receives MPEG compressed digital broadcast data transmitted through a network or satellite and enhances the compressed data, decodes the encoded data, and converts the decoded data into a standard National Television Standards Committee (NTSC) signals to be displayed on a TV receiver. The STBs are becoming more widespread as there are more and more digital TVs and digital broadcast contents. And recently, STBs have been developed as multi-functional devices having various additional functions including VCR functions, home network host functions, etc., in addition to the functions of receiving and decoding broadcast data.

For example, a server device may be configured to recommend to a TV receiver the broadcasts related to the broadcasts being displayed on the TV receiver. To this end, the server device may transmit to the TV receiver a channel map mapped with the channel numbers and channel information that the server device intends to recommend to the TV receiver. A user may view the broadcast that he/she wishes to view through the recommendation channel map received from the server device.

However, the recommendation channel map received from the server device may be different from the current viewing environment, for example, when the channel map of the STB has changed, when the STB has a B2C channel map but the server device provides a B2B channel map, and when the user changed the channel map of the STB to satisfy his/her taste. In these cases, if a station is selected according to the recommendation channel map transmitted from the server device, a problem may occur where a broadcast that is different from what was intended by the user is selected and output.

SUMMARY

Exemplary embodiments may address at least the above problems and/or disadvantages and other disadvantages not described above. The exemplary embodiments are not required to overcome the disadvantages described above, and may not overcome any of the problems described above.

One or more exemplary embodiments provide a display apparatus capable of recognizing channel information displayed and comparing channel information, thereby updating a channel map, and a channel map managing method thereof.

According to an aspect of an exemplary embodiment, there is provided a display apparatus for displaying contents, the display apparatus including: a storage configured to store a recommendation channel map including a plurality of channel numbers and channel information mapped to each channel number; an input unit for inputting a user command and selecting a channel; a contents receiver configured to receive an input of contents received through a channel corresponding to the input user command; a contents processor configured to process the contents; a display configured to display the contents processed in the contents processor; and a controller configured to compare the stored channel information mapped to the channel number in the recommendation channel map and channel information of the received contents, and to update the recommendation channel map according to a result of comparison.

The controller may recognize a text being displayed on a screen of the display such that it overlaps the contents for a predetermined time, and detect channel information of the contents.

The contents receiver may receive contents and channel information of the contents from a broadcast receiving device, and the controller may compare the channel information received from the broadcast receiving device and channel information included in the recommendation channel map.

The display apparatus may further include a communicator for receiving the recommendation channel map from a server device, and the controller may store the recommendation channel map received through the communicator in the storage, and in response to the recommendation channel map being updated, may transmit the updated recommendation channel map to the server device.

The controller may control the display to display a recommendation channel map including only the channel information on the contents that may be displayed by the display.

The controller may include a calculator configured to calculate a brightness average value of an entirety of a subject area that includes the text, and divide the subject area into a plurality of partial areas, and calculate a maximum brightness value and minimum brightness value regarding each of the plurality of partial areas, and calculate an average value of the calculated maximum brightness values and of the minimum brightness values; a text brightness determiner configured to determine a brightness of the text based on the calculated average value; and a text extractor configured to divide the subject area into the text and a background and to extract the text, according to the determined brightness of the text.

The calculator may calculate a first average value of the brightness values that are greater than a predetermined value regarding the entirety of the subject area and calculate a second average value of the brightness values that are smaller than the predetermined value, and the text brightness determiner may compare a first value that is a result of deduction of the first average value from the average value and a second value that is a result of deduction of the second average value from the average value, and determine whether the text is a bright text that is brighter than the background or a dark text that is darker than the background according to a result of comparison.

The text extractor, in response to the text being determined as a bright text, may extract to the text a pixel having a brightness value greater than a first text value in the subject area, and in response to the text being determined as a dark text, may extract to the text a pixel having a brightness value smaller than a second text value in the subject area, and the first text value may be greater than the second text value.

The text extractor may determine the first text value and the second text value by using following equations, respectively:

$$Th_{Bright} = HA - w*(HA - \text{Max}(HVUB, HVLB))$$
$$\left(\text{where, } w = \text{constant } K * \left(\frac{\delta}{\text{constant } R}\right), \text{ and}\right.$$
$$Th_{dark} = LA - w*(LA - \text{Min}(LVUB, LVLB))$$
$$\left(\text{where, } w = \text{constant } K * \left(\frac{\delta}{\text{constant } R}\right)\right)$$

According to an aspect of an exemplary embodiment, there is provided a recommendation channel map managing method including: storing a recommendation channel map including a plurality of channel numbers and channel information mapped to each channel number; in response to a channel being selected according to a user command, displaying contents received through the channel corresponding to the user command, and comparing the stored channel information mapped to the channel number in the recommendation channel map and channel information of the received contents, and updating the recommendation channel map according to a result of comparison.

The method may further include recognizing a text being displayed on a screen of the display such that it overlaps the contents for a predetermined time, and detects channel information of the contents.

The method may further include receiving channel information from a broadcast receiving device that provides the contents, and the updating the recommendation channel map may involve comparing the received channel information and the channel information included in the recommendation channel map.

The method may further include transmitting the updated recommendation channel map to a server device.

The method may further include displaying a recommendation channel map including only the channel information on the contents that may be displayed by the display.

The detecting the channel information may include calculating a brightness average of an entirety of a subject area that includes the text; dividing the subject area into a plurality of partial areas, and calculating a maximum brightness value and minimum brightness value regarding each of the plurality of partial areas, and calculating an average value of the calculated maximum brightness values and of the minimum brightness values; determining a brightness of the text based on the calculated average value; and dividing the subject area into the text and a background and extracting the text, according to the determined brightness of the text.

The determining a brightness of the text may involve calculating a first average value of brightness values that are greater than a predetermined value regarding the entirety of the subject area and calculating a second average value of brightness values that are smaller than the predetermined value, and comparing a first value that is a result of deduction of the first average value from the average value and a second value that is a result of deduction of the second average value from the average value, and determining whether the text is a bright text that is brighter than the background or a dark text that is darker than the background according to a result of comparison.

The extracting the text, in response to the text being determined as a bright text, may extract to the text a pixel having a brightness value greater than a first text value in the subject area, and in response to the text being determined as a dark text, may extract to the text a pixel having a brightness value smaller than a second text value in the subject area, and the first text value may be greater than the second text value.

The extracting the text may determine the first text value and the second text value by using the following equations, respectively:

$$Th_{Bright} = HA - w*(HA - \text{Max}(HVUB, HVLB))$$
$$\left(\text{where, } w = \text{constant } K * \left(\frac{\delta}{\text{constant } R}\right), \text{ and}\right.$$
$$Th_{dark} = LA - w*(LA - \text{Min}(LVUB, LVLB))$$
$$\left(\text{where, } w = \text{constant } K * \left(\frac{\delta}{\text{constant } R}\right)\right)$$

According to various exemplary embodiments, a user becomes able to view a broadcast that matches an input channel number even if a channel map received from the server device is not updated.

In addition, it is possible for the user to directly update the channel map even if the channel map stored in the server device is not updated.

BRIEF DESCRIPTION OF THE DRAWINGS

The above and/or other aspects will become more apparent by describing certain exemplary embodiments with reference to the accompanying drawings, in which:

FIGS. 7, 8, 9, and 10 are various examples of a channel map change according to an exemplary embodiment;

FIGS. 16 and 17 are various examples of channel information detected according to an exemplary embodiment.

DETAILED DESCRIPTION

Figure 1:
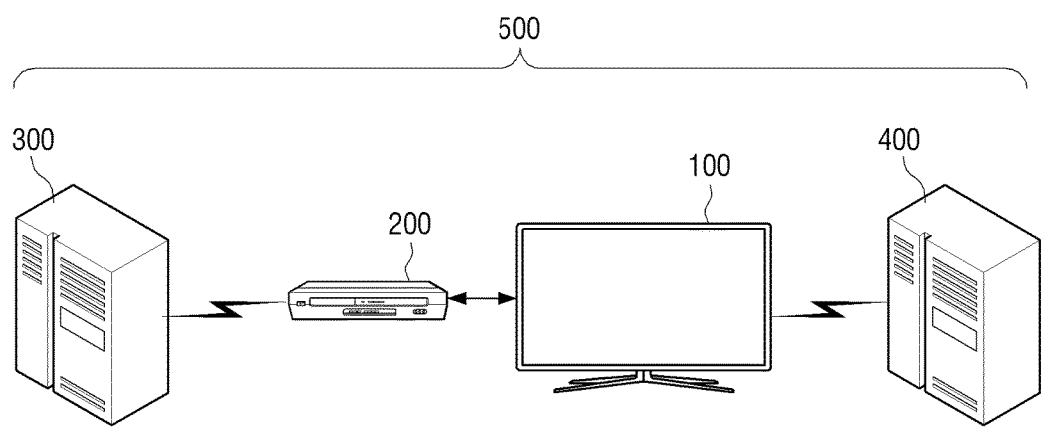
FIG. 1 is a view of a configuration of a display system according to an exemplary embodiment.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a view of a configuration of a display system 500 according to an exemplary embodiment. With reference to FIG. 1, a display system 500 according to an exemplary embodiment includes a contents providing server 300, broadcast receiving device 200, display apparatus 100, and server device 400.

The contents providing server 300 stores various contents. For example, the contents providing server 300 stores, together with various contents, channel numbers and channel information regarding each of the contents. The channel information may be various information provided for corresponding contents. For example, channel information may include broadcast names, contents names, broadcast station names, and contents providers' names mapped to the channel numbers. For example, a channel map may contain a list of the various channel numbers and the broadcast names, contents names, broadcast station names, contents providers' names, etc., mapped to each of the channel numbers. For example, the contents providing server 300 may transmit a channel map together with image signals of the contents to the broadcast receiving device 200.

The broadcast receiving device 200 may receive from the contents providing server 300 the channel map together with broadcast signals including image signals or contents signals. The broadcast receiving device 200 may be connected to the display apparatus 100 in a wired or wireless manner, and may transmit the received image signals to the display apparatus 100. The broadcast receiving device 200 may include various electronic devices such as an STB configured to provide broadcast signals including image signals or contents signals, etc., to the display apparatus 100.

The display apparatus 100 may receive image signals from the broadcast receiving device 200, and display contents corresponding to the received image signals. That is, in response to a user transmitting a remote control signal corresponding to a channel number to the display apparatus 100, the display apparatus 100 may transmit a signal corresponding to the received remote control signal to the broadcast receiving device 200, and the broadcast receiving device 200 may transmit an image signal corresponding to the received signal to the display apparatus 100. Further, in response to the user transmitting a remote control signal corresponding to a channel number to the broadcast receiving device 200, the broadcast receiving device 200 may transmit an image signal corresponding to the received remote control signal to the display apparatus 100. Thus, the display apparatus 100 may display the contents corresponding to the input channel number.

The server device 400 may receive channel information corresponding to the contents displayed by the display apparatus 100, and may recommend a channel map related to the received channel information. That is, the server device 400 may transmit to the display apparatus 100 a recommendation channel map including various broadcast names, contents names, broadcast station names, and contents providers' names related to the contents or broadcasts that are displayed by the display apparatus 100, and channel numbers mapped thereto. For example, in response to the display apparatus 100 displaying a sports broadcast, the server device 400 may transmit to the display apparatus 100 a recommendation channel map including various sports broadcast channels other than the broadcast currently being displayed and channel numbers mapped to each of these channels. The recommendation channel map received from the server device 400 may be displayed on one side of the screen displayed on the display apparatus 100.

If the channel map provided by the contents providing server 300 is different from the recommendation channel map provided by the server device 400, the display apparatus 100 may update at least one of the displayed channel numbers and channel information.

A method for the display apparatus 100 updating at least one of channel numbers and channel information is described in detail below.

Figure 2:
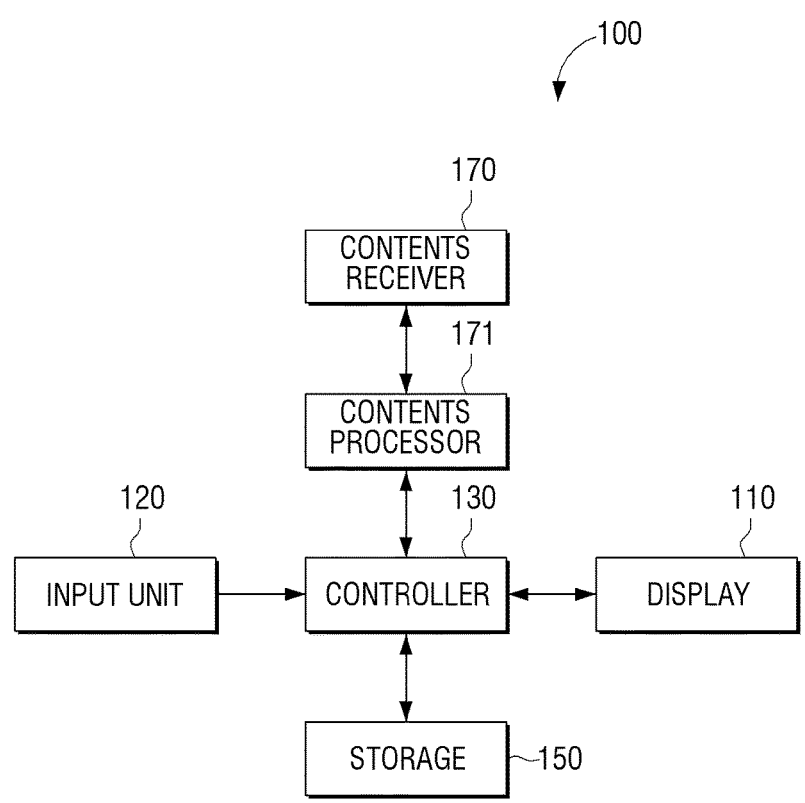
FIG. 2 is an example of a block diagram of a display apparatus according to an exemplary embodiment.

FIG. 2 is an example of a block diagram of a display apparatus 100 according to an exemplary embodiment.

The input unit 120 receives an input of a user command for selecting a channel. For example, the input unit 120 receives a signal transmitted by an external remote control, and then transmits the received signal to the controller 130. The remote control signal includes all signals received from the remote control. In response to the remote control transmitting to the input unit 120 the remote control signal corresponding to the channel number input by the user, the controller 130 may control so that the channel corresponding to the channel number input by the user is selected. The remote control may include a touch pad, and the received remote control signal may include a drag signal or touch signal for selecting any one of a plurality of channel numbers displayed, broadcast identifications (IDs), and contents names. Although a description of an input unit 120 corresponding to channel numbers is provided, there is no limitation thereto, and the input unit 120 may be configured to include any means for selecting one of various contents.

The contents receiver 170 receives broadcast signals or contents signals. For example, the contents receiver 170 receives the contents received through the channel corresponding to the input channel number. That is, the contents receiver 170 receives from the broadcast receiving device 200 an image signal corresponding to the broadcast signal or contents signal. The contents processor 171 may process the received image signal and convert it into video data, audio data, and other data. The controller 130 may control so that the video frame and audio frame generated by the contents processor 171 can be output, respectively.

The display 110 displays various images. For example, the display 110 displays the contents processed in the contents processor 171.

The contents receiver 170 receives the channel information of the contents from the broadcast receiving device 200. The storage 150 may store the channel information that the contents receiver 170 received. That is, the storage 150 may store a channel map including a plurality of channel numbers and channel information mapped to each channel number.

The display apparatus 100 may receive a recommendation channel map from the server device 400. The display apparatus 100 may further include a communicator configured to receive a recommendation channel map, and the controller 130 may display the received recommendation channel map.

In response to the recommendation channel map being displayed on one side of the display screen, the user may input the channel number to be displayed through the recommendation channel map. The controller 130 may display the contents mapped to the input channel number.

The displayed recommendation channel map may include only the channel information on the contents that may be displayed by the display apparatus 100. An example may be a case where the display apparatus 100 that has been set with adult contents restriction receives a recommendation channel map including the channel numbers of adult contents and channel information thereof from the server device 400. In response to a user having set a channel restriction, or in response to a restriction to the channels provided to the display apparatus 100 according to service ratings, etc., the controller 130 may control the display apparatus 100 to display a recommendation channel map including only the information on the channels that may be displayed. Comparing the channel numbers and channel information of the channel map stored in the storage 150 with the channel numbers and channel information of the recommendation channel map is described in detail below.

If the channel map stored in the storage 150 is different from the recommendation channel map, the contents mapped to the channel number that the user inputs will not be displayed correctly. For example, even though the contents mapped to number 1 in the channel map received from the contents providing server 300 and stored in the storage 150 is AAA, the contents mapped to number 1 in the recommendation channel map received from the server device 400 may be BBB. The user may wish to view BBB through the displayed recommendation channel map and input the channel number corresponding to number 1, but in response to the channel number corresponding to number 1 being input, the broadcast receiving device 200 will transmit the image signal corresponding to AAA to the display apparatus 100, and thus the user will not be able to view the contents that he/she wishes to view.

For example, the controller 130 may compare the channel information received from the broadcast receiving device 200 and the channel information included in the channel map, and update the recommendation channel map. The details are as follows.

In response to the user inputting a particular channel number, the controller controls so that the contents corresponding to the input channel number can be displayed. The controller 130 may control so that the channel number and channel information corresponding to the displayed contents may be displayed for a predetermined time. The controller 130 may control so that the channel number and channel information are displayed on one area at one side of the contents screen for a predetermined time.

Next, the controller 130 may recognize the displayed channel number and channel information, thereby detecting the channel information of the contents. The channel number and channel information may be displayed in a text format, and the method of recognizing the text is described in greater detail below with reference to FIG. 13.

The controller 130 that recognized the channel information may compare the channel information included in the channel map received from the contents providing server 300 and stored with the channel information included in the recommendation channel map received from the server device 400. For example, in response to these two channel information being different from each other, the controller 130 may update the channel information included in the recommendation channel map to be mapped to the channel information included in the channel map.

Next, in response to the recommendation channel map being updated, the controller 130 may transmit the updated recommendation channel map to the server device 400.

FIGS. 3A to 6 illustrate an example of a channel map and a display screen according to an exemplary embodiment.

Figure 3A:
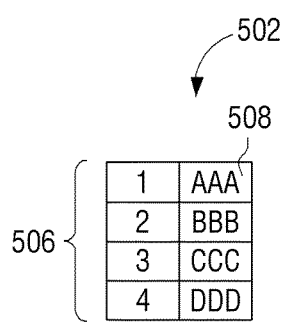
FIGS. 3A and 3B show examples of a channel map according to an exemplary embodiment.
Figure 3B:
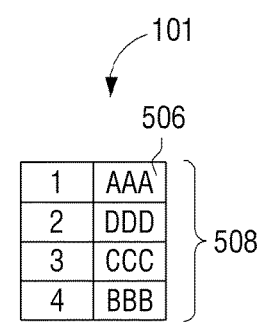

The table of FIG. 3A is a channel map 502 received from the contents providing server 300 and stored in the storage 150. The table of FIG. 3B is an example of a recommendation channel map 101 received from the server device 400 and then displayed. The numbers 506 illustrated at the left of the table are channel numbers, and the texts 508 illustrated at the right of the table are channel information. The channel information may be broadcast station names. For example, in response to the user inputting number 1, the display apparatus 100 displays the broadcast or contents that AAA broadcast station transmits.

In the channel map 502, the channel information on number 2 is set to BBB, but in the recommendation channel map 101, the channel information on number 2 is set to DDD. That is, the channel map and the recommendation channel map are different from each other.

Figure 4:
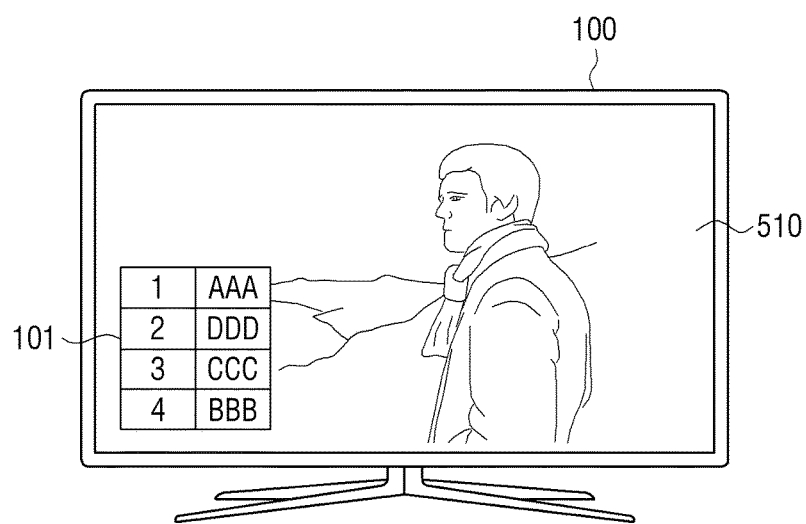
FIG. 4 is an example of a channel map displayed on a screen of a display apparatus according to an exemplary embodiment.

As described above, the display apparatus 100 may receive a recommendation channel map from the server device 400 and display the received recommendation channel map. As illustrated in FIG. 4, the controller 130 displays the recommendation channel map 101 at one side of the display screen. The user may select the broadcast or contents that he/she wishes to view with reference to the displayed recommendation channel map.

Suppose that a user wishes to view DDD content 510, as illustrated in FIG. 4. The user will input number 2 in accordance with the displayed recommendation channel map 101. However, as illustrated in FIG. 3A, in the channel map 502, the channel information mapped to number 2 is set to BBB. For example, even in response to the user wishing to view DDD content 510, since the channel information mapped to the input number 2 is BBB, BBB content 512 will be selected and displayed, as illustrated in FIG. 5.

Figure 5:
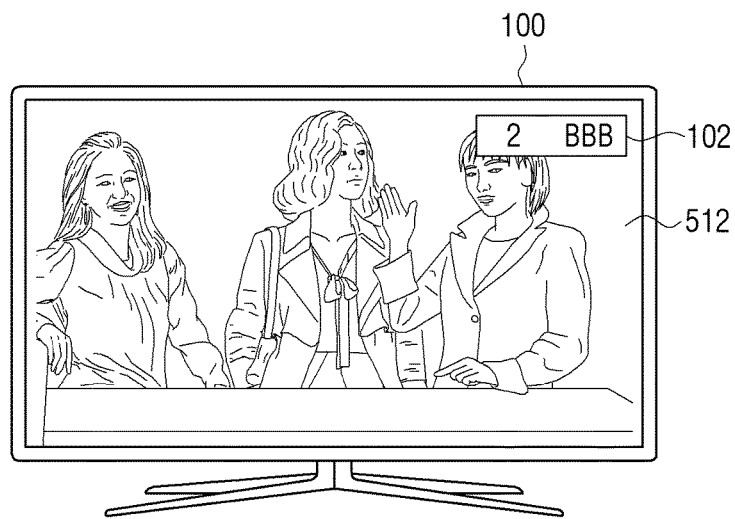
FIGS. 5 and 6 are examples of a display screen according to an exemplary embodiment.
Figure 6:
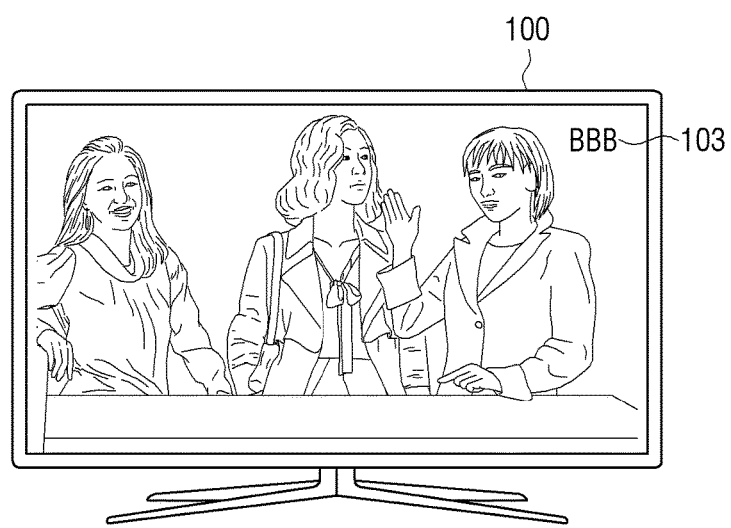

The controller 130 may display channel numbers and channel information together on one side of the screen as illustrated in FIG. 5 (reference numeral 102). The controller 130 may also display only the channel information 103 on one side of the screen as illustrated in FIG. 6.

The controller 130 recognizes the displayed channel information. That is, since channel information is displayed in a text format, the controller 130 recognizes the displayed text, thereby recognizing the channel information on the contents currently being displayed. That is, the controller 130 may recognize that the channel information on the contents displayed as a result of inputting number 2 is BBB.

Next, the controller 130 may determine whether or not the channel information included in the recommendation channel map 101 and the channel information included in the channel map regarding the same channel number are identical to each other. In the described-above example, since the channel information displayed and recognized is BBB and the channel information included in the recommendation channel map 101 regarding the same channel number is DDD, the controller 130 may update the recommendation channel map 101. That is, the controller 130 may update the channel number 2 in the recommendation channel map 101 to correspond to the BBB which is the channel information displayed and recognized. As another example, the controller 130 may update the channel number 4 in the recommendation channel map 101 to correspond to the DDD. For example, the updated recommendation channel map may be stored in the storage 150, and transmitted to the server device 400.

FIGS. 7 to 10 are various examples of channel map change according to an exemplary embodiment. Below is a description of a case where the recommendation channel map as illustrated in FIGS. 7 to 10 is updated regarding the channel map 502 illustrated in FIG. 3A.

Figure 7:
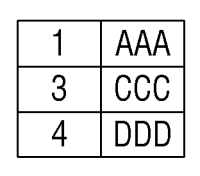

In FIG. 7, BBB which is the channel information mapped to channel number 2 is not included in the recommendation channel map. The controller 130 may update the recommendation channel map to create channel number 2 and channel information BBB that is mapped thereto.

Figure 8:
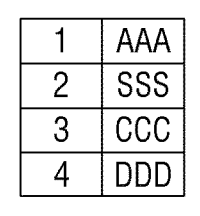

With reference to FIG. 8, in the recommendation channel map, the channel information mapped to channel number 2 is SSS. The controller 130 may update the recommendation channel map to change the channel information mapped to channel number 2 to BBB.

Figure 9:
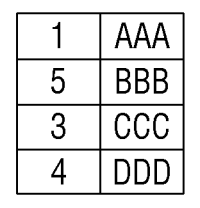

With reference to FIG. 9, in the recommendation channel map, the channel number mapped to channel information BBB is number 5. The controller 130 may update the recommendation channel map to change the channel number mapped to channel information BBB to number 2.

Figure 10:
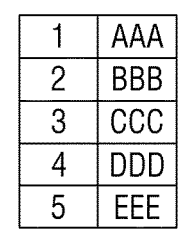

With reference to FIG. 10, channel number 5 that is not included in the channel map and the channel information EEE that is mapped thereto are included in the recommendation channel map. The controller 130 may update the recommendation channel map to delete channel number 5 and the channel information EEE that is mapped thereto.

Figure 11:
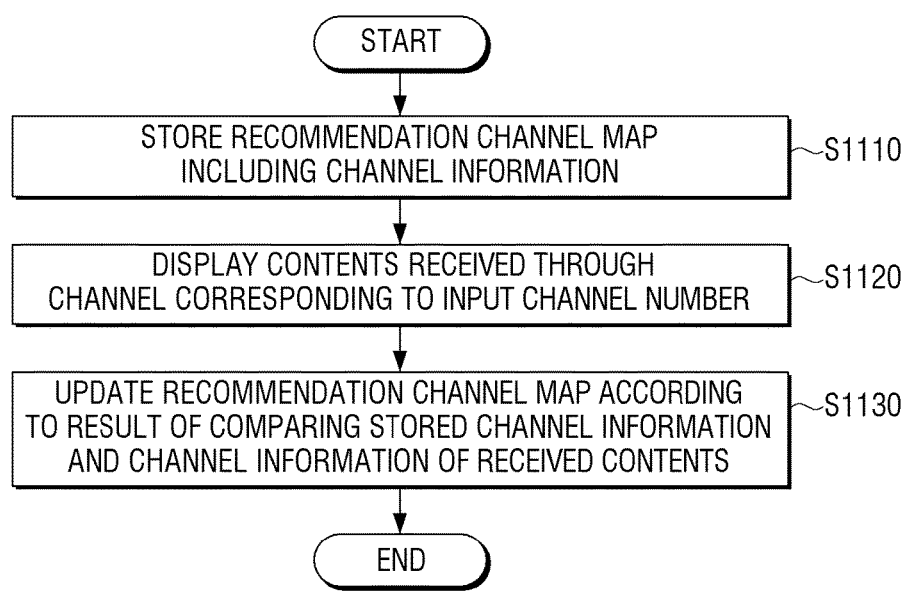
FIG. 11 is an example of a flowchart of a channel map managing method of a display apparatus according to an exemplary embodiment.

FIG. 11 is an example of a flowchart of a channel map managing method of a display apparatus according to an exemplary embodiment.

The display apparatus 100 may receive channel information from the broadcast receiving device 200 that provides contents. The display apparatus 100 stores a channel map that includes a plurality of channel numbers and channel information mapped to each channel number (operation S1110).

Next, the display apparatus 100 may display a recommendation channel map that includes the information on the contents that may be displayed by the display apparatus 100.

Next, in response to a channel number being input, the display apparatus 100 displays the contents being received through the channel corresponding to the input channel number (operation S1120). There is no limitation to inputting only a channel number as described above, and various user commands for selecting one of a plurality of contents are contemplated.

The display apparatus 100 may recognize the text that overlaps the screen of the display 110 and is displayed for a predetermined time, and detect channel information of the contents, as described in detail below with reference to FIGS. 13 to 17.

The display apparatus 100 compares the stored channel information mapped to the channel number in the recommendation channel map and the channel information of the received contents, and updates the received recommendation channel map according to a result of comparison (operation S1130).

The display apparatus 100 may compare the channel information included in the received recommendation channel map with the channel information included in the channel map and update the recommendation channel map.

Next, the display apparatus 100 may transmit the updated recommendation channel map to the server device 400.

Figure 12:
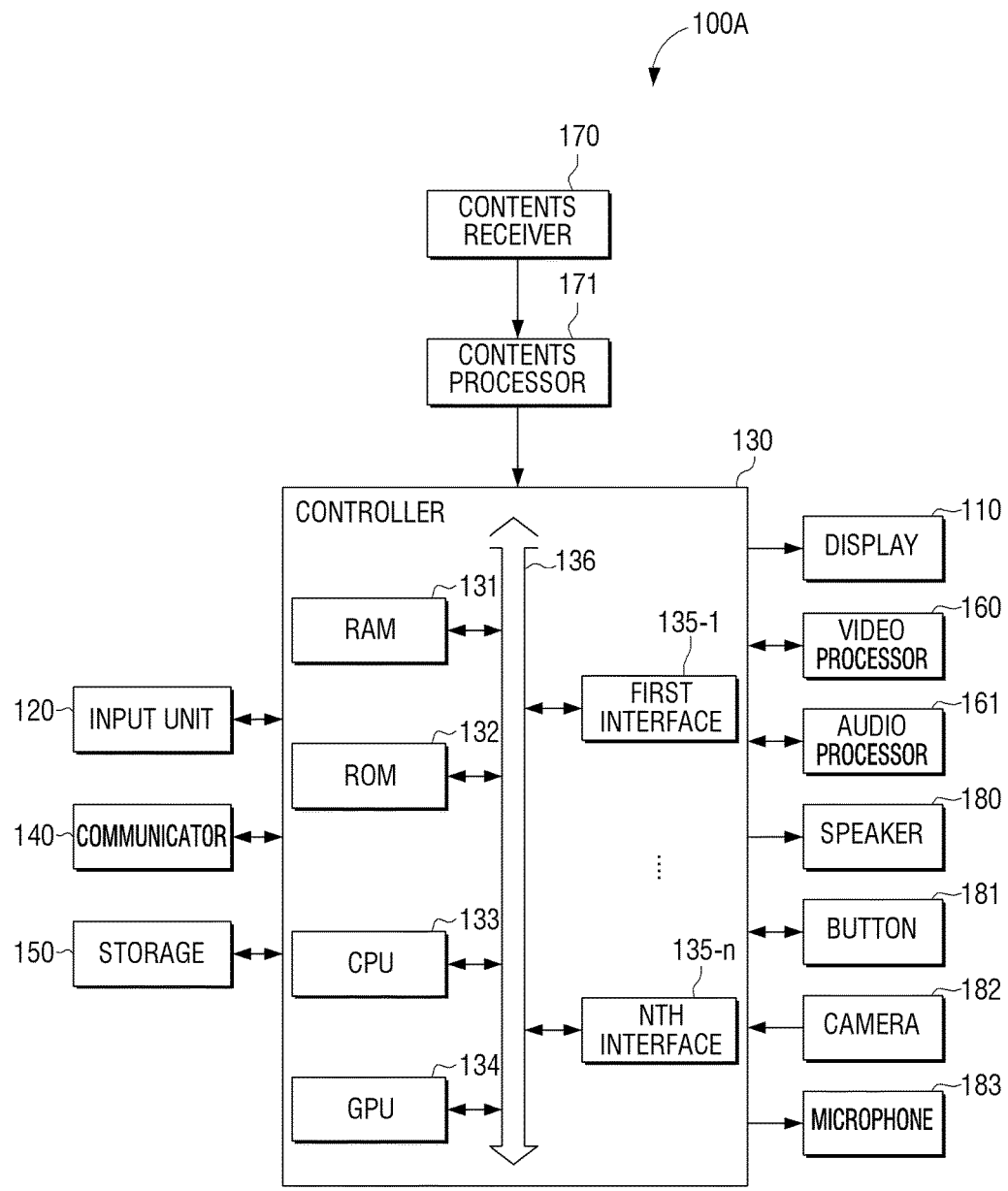
FIG. 12 is another example of a block diagram of a display apparatus according to an exemplary embodiment.

FIG. 12 is an example of a block diagram of a display apparatus 100A according to an exemplary embodiment.

According to FIG. 12, the display apparatus 100A includes a display 110, input unit 120, controller 130, communicator 140, storage 150, video processor 160, audio processor 161, contents receiver 170, contents processor 171, speaker 180, button 181, camera 182, and microphone 183. Of the elements illustrated in FIG. 12, further description of the elements that are described above with reference to FIG. 2 will be omitted.

The contents receiver 170 receives a broadcast signal or contents signal. For example, the contents receiver 170 receives an input of contents being received through a channel corresponding to the input channel number.

The contents processor 171 is configured to process the broadcast signal that the contents receiver 170 received and to convert the processed broadcast signal into video data, audio data, and other data. In response to a broadcast signal being received, the contents processor 171 performs signal processing such as decoding, equalizing, demultiplexing, deinterleaving, decoding, etc., and creates a video frame and audio signal. The generated video frame is provided to the display 110, and the audio signal is provided to the speaker 180.

The display 110 displays various images. The display 110 may include various types of displays including Liquid Crystal Display (LCD), Organic Light Emitting Diode (OLED) display, and Plasma Display Panel (PDP) display, etc. The display 110 may include a driving circuit and backlight unit that may be implemented as one of amorphous silicon (a-si) TFT, low temperature polysilicon (LTPS) TFT, and organic TFT (OTFT).

The input unit 120 receives an input of a channel number. For example, the input unit 120 receives a signal transmitted from an external remote control and transmits the received signal to the controller 130.

The communicator 140 performs communication with an external device according to various types of communication methods. For example, the communicator 140 may perform communication with various external devices including a broadcast receiving device 200 and server device 400. The communicator 140 may include various communication chips such as a WiFi chip, Bluetooth chip, wireless communication chip, NFC chip, etc.

The communicator 140 may receive a recommendation channel map from the server device. For example, the controller 130 may store the recommendation channel map received through the communicator 140 in the storage 150, and in response to the recommendation channel map being updated, the controller 130 may transmit the updated recommendation channel map to the server device 400.

The storage 150 stores various data such as operating system (OS) software module for driving the display apparatus 100A, various multimedia contents, various applications, and various contents input or determined while an application is being executed. For example, the storage 150 may store a channel map that includes a plurality of channel numbers and channel information mapped to each channel number.

The controller 130 controls the overall operations of the display apparatus 100A using various programs stored in the storage 150.

More specifically, the controller 130 includes a RAM 131, ROM 132, main CPU 133, graphic processor (GPU) 134, and $1^{st}$ to nth interfaces 135-1 to 135-n, and bus 136.

The RAM 131, ROM 132, main CPU 133, graphic processor 134, and $1^{st}$ to nth interfaces 135-1 to 135-n may be connected to one another through bus 136.

The 1st to nth interfaces 135-1 to 135-*n* are connected to the described above various elements. One of the interfaces may be a network interface that is connected to the external device through a network.

The main CPU 133 accesses the storage 150 and performs booting using the OS stored in the storage 150. In addition, the main CPU performs various operations using various programs, contents, data, etc., stored in the storage 150.

In the ROM 132, a command set for system booting is stored. In response to a turn on command being input and power being supplied, the main CPU 133 copies the OS stored in the storage 150 to the RAM 131 according to the command stored in the ROM 132, and executes the OS to boot the system. In response to the booting being completed, the main CPU 133 copies various application programs stored in the storage 150 to the RAM 131, and executes the application program copied in the RAM 131 to perform various operations.

The graphic processor 134 creates a screen including various objects such as an icon, image, text, etc., using an operator and rendering (not illustrated). The operator performs arithmetic operations of feature values such as a coordinate value, shape, size, color, etc., of each object according to the layout of the screen based on the control command received. The rendering creates screens of various layouts including objects based on the feature values operated in the operator. The screen created in the rendering is displayed inside a display area of the display 110.

The video processor 160 is configured to process video data. The video processor 160 may perform various image processing such as decoding, scaling, noise filtering, frame rate conversion, resolution conversion, etc., regarding the video data.

The audio processor 161 is configured to process audio data. The audio processor 161 may perform various processing such as decoding, amplifying, and noise filtering of audio data. For example, the audio processor 161 may create a feedback sound corresponding to when there is a check in interaction and when there is an interaction where a badge item is selected, and provide the created feedback sound.

The speaker 180 is configured to output various audio data processed in the audio processor 161 and various alarm sounds and voice messages.

The button 181 may be one of any type of button such as a mechanical button, touch pad, or wheel formed on any area such as a front part, side part, or rear part of the exterior of the main body of the display apparatus 100A. For example, there may be provided a button for turning on/off the power of the display apparatus 100A.

The camera 182 is configured to photograph a still image or a video according to a user's control. For example, the camera 182 may photograph various user's motions or gestures for controlling the display apparatus 100A.

The microphone 183 is configured to receive a user's voice or other sound for controlling the display apparatus 100A and to convert the received user's voice or sound into audio data. The controller 130 converts the user's voice input through the microphone 183 into audio data and uses the converted audio data to control the display apparatus 100A. The camera 182 and microphone 183 may be a part of the input unit 120 according to its functions.

In response to an image data and an audio data provided by a camera 182 and microphone 183, respectively, the controller 130 may perform a control operation according to the user's voice input through the microphone 183 or the user's motion recognized by the camera 182. That is, the display apparatus 100A may operate in a motion control mode or voice control mode. When the display apparatus 100A operates in a motion control mode, the controller 130 activates the camera 182 to photograph the user, and tracks the motion change of the user and performs a control operation corresponding thereto. When the display apparatus 100A operates in a voice control mode, the controller 130 analyzes the user's voice input through the microphone, and performs a control operation corresponding to the analyzed user's voice.

Various external input ports such as headsets, mouse, LAN, etc., may be further provided to connect the display apparatus 100A with various external terminals.

FIG. 12 is only an example of a configuration of the display apparatus 100A. According to exemplary embodiments, some of the elements illustrated in FIG. 12 may be changed or omitted, or other elements may be further provided.

Figure 13:
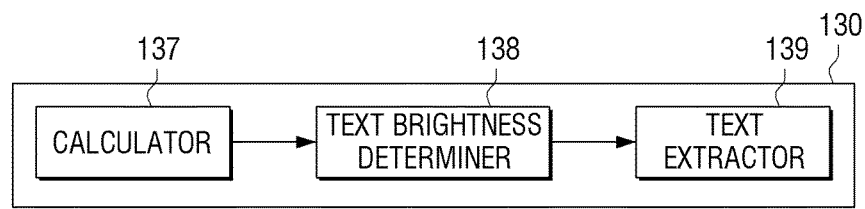
FIG. 13 is a block diagram of a controller according to an exemplary embodiment.

FIG. 13 is an example of a block diagram of a controller 130 according to an exemplary embodiment. With reference to FIG. 13, a controller 130 according to an exemplary embodiment further includes a calculator 137, text brightness determiner 138, and text extractor 139.

As described above, the display 110 may display, together with the contents, the channel numbers and/or channel information regarding the contents. As illustrated in FIG. 5 or FIG. 6, the channel numbers and/or channel information may be displayed on one area formed at one side of the contents screen, and in order to recognize the displayed channel number and/or channel information, a text area needs to be detected first. The text area may include an area on the display screen where the channel numbers and/or channel information are displayed.

In the display screen as illustrated in FIG. 5 or FIG. 6, the calculator 137 detects at least one text area using a text area detecting technology. For example, a feature amount detecting method that has its basis on a corner point in order to detect a feature amount, and a feature amount detecting method that has its basis on an invariable feature amount may be performed. It is also possible to detect a feature amount based on Maximally Stable Extremal Region (MSER). A feature amount means the points that become the features in an image. A feature amount may usually be detected in a corner point or boundary in an image. There may be various methods to detect a text area, and at least one appropriate method may be selected and performed according to the corresponding image. The method of detecting a text area is known to those skilled in the art, and, thus, detailed explanation thereof is omitted.

Figure 14:
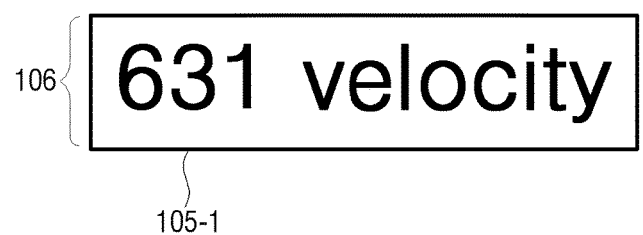
FIGS. 14 and 15 are various examples of a view for recognizing channel information in a subject area according to an exemplary embodiment.
Figure 15:
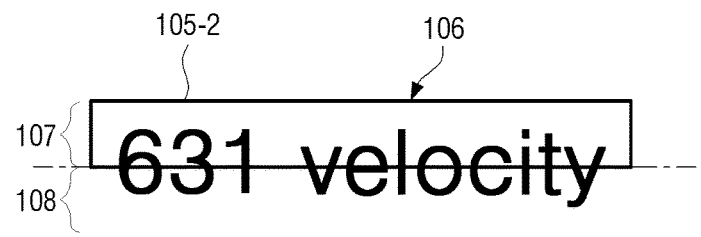

An example of at least one text area detected by the calculator 137 is illustrated in FIGS. 14 and 15. In the detected text area, i.e., a subject area, at least one number and/or letter is formed.

In order to detect the text regarding the subject area 106, the calculator 137 may determine a window having a size of n by m. As illustrated in FIG. 14, the calculator 137 situates the window 105-1 at an entirety of the subject area 106, and calculates a brightness average value of the entirety of the subject area 106.

The calculator 137 calculates a first average value (HA) of the brightness values that are greater than a predetermined threshold value (Th) and a second average value (LA) of the brightness values that are smaller than the predetermined threshold value (Th) regarding the entirety of the subject area 106. The threshold value may be calculated using the image thresholding technology known to those skilled in art, as for example, the Otsu method, NiBlack method, minimum error method, maximum entropy method, etc. The Otsu method is used in the present exemplary embodiment. Regarding the Otsu method, see "A Threshold Selection Method from Gray-level Histograms", IEEE Trans. On System, Man and Cybernetics, Vol. SMC-9, No. 1, pp. 62-66, January 1979.

The method of calculating the first average value and second average value using the threshold value is based on mathematical equation 1 and mathematical equation 2, respectively, as shown below. The first average value may be the average value of the values that are greater than the threshold value in the subject area (HA, Higher Average), and the second average value may be the average value of the values that are smaller than the threshold value in the subject area (LA, Lower Average).

$$HA = \frac{\sum_{it}\sum_{jt} \text{Text}_{candidate}(i_t, j_t), \text{ if } \text{Text}_{candidate}(i_t, j_t) > Th}{\# \text{ of Higher Text}_{candidate} \text{ Values}}$$ [mathematical equation 1]

where $i_t, j_t$ is height and width of text candidate region, respectively $$LA = \frac{\sum_{it}\sum_{jt} \text{Text}_{candidate}(i_t, j_t), \text{ if } \text{Text}_{candidate} < Th}{\# \text{ of Lower (Text)}_{candidate} \text{ Values}}$$ [mathematical equation 2]

where $i_t, i_t$ is height and width of text candidate region, respectively

The calculator 137 may divide the subject area 106 into a plurality of partial areas 107, 108. As illustrated in FIG. 15, the calculator 137 may situate the window 105-2 regarding a top end area 107, i.e., a first partial area, that is part of the subject area 106. Likewise, the calculator 137 may situate the window regarding a low end area 108, i.e., a second partial area, that is part of the subject area 106. For example, the calculator 137 may calculate a maximum brightness value and minimum brightness value for each of the plurality of partial areas 107, 108, and may calculate an average value of the calculated maximum brightness values and an average value of the calculated minimum brightness values.

The calculator 137 calculates the greatest value of the brightness values regarding the first partial area (HVUB, Highest Value of Upper Background), and the smallest value regarding the first partial area (LVUB, Lowest Value of Upper Background). These values are derived from mathematical equation 3 and mathematical equation 4.

$HVUB=\text{Max}(\text{Background}_{Upper}(i_{ub}, j_{ub}))$, (where, $HVUB<HA$) [mathematical equation 3]

$LVUB=\text{Min}(\text{Background}_{Upper}(i_{ub}, j_{ub}))$, (where, $LVUB<LA$) [mathematical equation 4]

The calculator 137 calculates the greatest value of the brightness values regarding the second partial area (HVLB, Highest Value of Lower Background) and the smallest value of the brightness values regarding the second partial area (LVLB, Lowest Value of Lower Background). These values are derived from mathematical equation 5 and mathematical equation 6.

$HVLB=\text{Max}(\text{Background}_{Lower}(i_{lb}, j_{lb}))$, (where, $HVLB<HA$) [mathematical equation 5]

$LVLB=\text{Min}(\text{Background}_{Lower}(i_{lb}, j_{lb}))$, (where $LVLB<LA$) [mathematical equation 6]

Next, the calculator 137 calculates the average background brightness value of the brightness values regarding the first partial area and the second partial area (BA, Background Average). Th average background brightness value is derived from mathematical equation 7.

$$BA = \frac{\sum_{iub}\sum_{jub} \text{Background}_{upper}(i_{ub}, j_{ub}) + \sum_{ilb}\sum_{jlb} \text{Background}_{Lower}(i_{lb}, j_{lb})}{\# \text{ of Background Values}}$$ [mathematical equation 7]

where $i_{ub}, j_{ub}$ is height and width of the upper background region, respectively $i_{lb}, j_{lb}$ is height and width of the lower background region, respectively The text brightness determiner 138 may determine the brightness of the text based on the calculated average background brightness value, and the text extractor 139 may divide the subject area into the text and background and extract the text according to the determined text brightness.

More specifically, the text brightness determiner 138 may compare the first value (|BA−HA|) which is a result of deduction of the first average value (HA) from the average background brightness value (BA) with the second value (|BA−LA|) which is a result of deduction of the second average value (LA) from the average background brightness value (BA), and may determine whether the text is a brighter text than the background or a darker text than the background according to a result of comparison. If the first value is greater than the second value, it can be determined that the text included in the subject area is a bright text having a pixel value brighter than the background area. If the first value is smaller than the second value, it can be determined that the text included in the subject area is a dark text having a pixel value darker than the background area. The mathematical equation for determining the bright text or dark text is as shown below.

Bright text=|BA−HA|>|BA−LA|

Dark Text=|BA−HA|<|BA−LA| [mathematical equation 8]

The text extractor 139 extracts the text determined as being a bright text or dark text from the background area.

More specifically, in response to the text being determined as a bright text, the text extractor 139 extracts a pixel having a greater brightness value than the first text value $Th_{bright}$ in the subject area as the text pixel. Likewise, in response to the text being determined as a dark text, the text extractor 139 extracts a pixel having a smaller brightness value than the second text value $Th_{dark}$ in the subject area as the text pixel. The first text value and the second text value may be determined by mathematical equation 9 and mathematical equation 10, respectively, as shown below. The first text value may be greater than the second text value.

$$Th_{Bright} = HA - w*(HA - \text{Max}(HVUB, HVLB))$$ [mathematical equation 9]

$$\left(\text{where, } w = \text{constant } K * \left(\frac{\delta}{\text{constant } R}\right)\right)$$

-continued $$Th_{dark} = LA - w*(LA - \text{Min}(LVUB, LVLB)) \quad \text{[mathematical equation 10]}$$
$$\left(\text{where, } w = \text{constant } K * \left(\frac{\delta}{\text{constant } R}\right)\right)$$

In this case, w is a weight value, and the calculation may be made taking into account the standard deviation (σ) of the subject area. With reference to the above mathematical equation, the greater the standard deviation, the greater the weight value. For example, in the case of a bright text, the first text value is reduced, whereas in the case of a dark text, the second text value is increased.

The constant value R may be 128 as the maximum value in a 256-gray scale that is 8 bit image, and the constant value k is between 0 and 1, which may be determined experimentally.

Next, the text extractor 139 may perform thresholding of the calculated brightness value of the text. That is, the text extractor 139 makes a bright text that is greater than the first text value to have the maximum brightness value, and makes a dark text that is smaller than the second text value to have a minimum brightness value. Mathematical equation 11 and mathematical equation 12 show thresholding a brightness value of the text. FIG. 16 is a view illustrating a result of thresholding a bright text (104-1), and FIG. 17 is a view illustrating a result of thresholding a dark text (104-2).

if (Text_Candidate($i,j$)>$Th_{Bright}$),Text_Bright($i,j$)=255
 else Text_Bright($i,j$)=0   [mathematical equation 11]

if (Text_Candiate($i,j$)<$Th_{Dark}$),Text_Dark($i,j$)=255
 else Text_Dark($i,j$)=0   [mathematical equation 12]

Next, the text extractor 139 may extract a text from the thresholded text image. It can be seen that the bright text and dark text illustrated in FIG. 16 and FIG. 17, respectively, is merely a difference due to the brightness value of the text, and that the text extracted by the text extractor 139 is the same text. For example, the controller 130 becomes able to recognize the displayed channel number and/or channel information as described above, and update the recommendation channel map.

A recommendation map managing method of a display apparatus according to the described above various exemplary embodiments may be stored in a non-transitory computer-readable medium. Such a non-transitory computer-readable medium may be mounted onto various apparatuses and be used.

For example, a program code for performing a recommendation channel map managing method including storing a recommendation channel map including a plurality of channel numbers and channel information mapped to each channel number; when a channel number is input, displaying contents received through a channel corresponding to the input channel number; and comparing the stored channel information mapped to the channel number in the recommendation channel map with the channel information of the received contents, and updating the recommendation channel map according to a result of comparison may be stored in a non-transitory computer-readable medium and be provided.

A non-transitory computer-readable medium refers to a medium readable by an apparatus, the medium storing data semi-permanently and not a medium that stores data for a short period of time such as a register, cache, and memory, etc. More specifically, a non-transitory computer-readable medium may be a CD, DVD, hard disk, Blu-ray disk, USB, memory card, and ROM, etc.

The foregoing exemplary embodiments and advantages are merely exemplary and are not to be construed as limiting. The present teaching can be readily applied to other types of apparatuses. The description of the exemplary embodiments is intended to be illustrative, and not to limit the scope of the claims, and many alternatives, modifications, and variations will be apparent to those skilled in the art. For example, each single component may be separated into multiple components which are then separately implemented. Also, separated components may be combined together and implemented as a single component.

What is claimed is:

1. A display apparatus comprising:
    a communicator configured to receive a recommendation channel map comprising channel numbers and channel information mapped to channel numbers from a server device;
    a memory configured to store the recommendation channel map;
    a receiver configured to receive a user command corresponding to a respective channel number;
    a network interface configured to receive contents through a channel corresponding to the user command;
    a display configured to display the contents; and
    a processor configured to compare the stored channel information mapped to the respective channel number in the stored recommendation channel map and channel information of the received contents, and to update the recommendation channel map according to a result of comparison,
    wherein the server device is different than a contents providing server which provides the contents through a broadcast receiving device,
    wherein the network interface is further configured to receive the contents and the channel information of the contents from the broadcast receiving device, and
    wherein the processor is further configured to compare the channel information received from the broadcast receiving device with the stored channel information included in the stored recommendation channel map and to control the communicator to transmit the updated recommendation channel map to the server device, in response to the recommendation channel map being updated.

2. The display apparatus according to claim 1, wherein the processor is further configured to recognize a text being displayed on a screen of the display to overlap the contents for at least a predetermined time, and detect the channel information of the received contents from the text.

3. The display apparatus according to claim 1, wherein the processor is further configured to control the display to display the recommendation channel map comprising only the channel information of the contents that may be displayed by the display.

4. The display apparatus according to claim 2, wherein the processor implements:
    a calculator configured to calculate a brightness average value of an entirety of a subject area that includes the text, divide the subject area into a plurality of partial areas, calculate a maximum brightness value and a minimum brightness value in each of the plurality of partial areas, and calculate an average background brightness value based on the calculated maximum brightness values and the calculated minimum brightness values;

a text brightness determiner configured to determine a brightness of the text based on the calculated average background brightness value; and a text extractor configured to divide the subject area into the text and a background and to extract the text, according to the determined brightness of the text.

5. The display apparatus according to claim 4, wherein the calculator is further configured to calculate a first average value of the brightness values that are greater than a threshold value and a second average value of the brightness values that are smaller than the threshold value, for the entirety of the subject area, and the text brightness determiner is further configured to compare a first value that is a difference between the first average value and the average background brightness value and a second value that is a difference between the second average value and the average background brightness value, and to determine whether the text is a bright text that is brighter than the background or a dark text that is darker than the background according to a result of comparison.

6. The display apparatus according to claim 5, wherein the text extractor is further configured to extract as the text a pixel having a brightness value greater than a first text value in the subject area, in response to the text being determined as the bright text, and to extract as the text a pixel having a brightness value smaller than a second text value in the subject area, in response to the text being determined as the dark text, and the first text value is greater than the second text value.

7. The display apparatus according to claim 6, wherein the text extractor is further configured to determine the first text value and the second text value according to following equations, respectively:

$$Th_{Bright} = HA - w*(HA - \text{Max}(HVUB, HVLB))$$
$$\left(\text{where, } w = \text{constant } K * \left(\frac{\delta}{\text{constant } R}\right)\right) \text{ and}$$
$$Th_{dark} = LA - w*(LA - \text{Min}(LVUB, LVLB))$$
$$\left(\text{where, } w = \text{constant } K * \left(\frac{\delta}{\text{constant } R}\right)\right),$$

where $Th_{bright}$ is the first text value,
$Th_{dark}$ is the second text value,
w is a weight value,
σ is a standard deviation of the subject area,
R is a constant representing a gray scale,
K is a constant between 0 and 1,
HA is the first average value,
LA is the second average value,
HVUB is the maximum brightness value in a first partial area of the plurality of partial areas,
HVLB is the maximum brightness value in a second first partial area of the plurality of partial areas,
LVUB is the minimum brightness value in the first partial area, and
LVLB is the minimum brightness value in the second first partial area.

8. A recommendation channel map managing method comprising:
receiving a recommendation channel map comprising channel numbers and channel information mapped to channel numbers;
storing a recommendation channel map;
receiving a user command corresponding to a respective channel number;
receiving contents through a channel corresponding to the user command;
displaying the contents;
comparing the stored channel information mapped to the respective channel number in the stored recommendation channel map and channel information of the received contents; and
updating the recommendation channel map according to a result of comparison,
wherein the receiving contents further comprises receiving the channel information from a broadcast receiving device that provides the contents,
wherein updating the recommendation channel map further comprises comparing the channel information received from the broadcast receiving device with the stored channel information included in the stored recommendation channel map, and
wherein the method further comprises transmitting the updated recommendation channel map to a server device, in response to the recommendation channel map being updated.

9. The method according to claim 8, further comprising:
recognizing a text being displayed on a screen of the display so that the text overlaps the contents for at least a predetermined time; and
detecting the channel information of the received contents from the text.

10. The method according to claim 8, further comprising displaying the recommendation channel map comprising only the channel information of the contents that may be displayed by the display.

11. The method according to claim 9, wherein the detecting the channel information comprises:
calculating a brightness average of an entirety of a subject area that includes the text;
dividing the subject area into a plurality of partial areas;
calculating a maximum brightness value and a minimum brightness value for each of the plurality of partial areas;
calculating an average background brightness value based on the calculated maximum brightness values and the calculated minimum brightness values;
determining a brightness of the text based on the calculated average background brightness value;
dividing the subject area into the text and a background; and
extracting the text, according to the determined brightness of the text.

12. The method according to claim 11, wherein the determining the brightness of the text comprises:
calculating a first average value of brightness values that are greater than a predetermined value, for the entirety of the subject area;
calculating a second average value of brightness values that are smaller than the predetermined value, for the entirety of the subject area;
comparing a first value that is a difference between the first average value and the average background brightness value and a second value that is a difference between the second average value and the average background brightness value; and
determining whether the text is a bright text that is brighter than the background or a dark text that is darker than the background according to a result of comparison.

13. The method according to claim 12, wherein the extracting the text comprises:
   extracting, as the text, a pixel having a brightness value greater than a first text value in the subject area in response to the text being determined as the bright text; and
   extracting, as the text, a pixel having a brightness value smaller than a second text value in the subject area in response to the text being determined as the dark text, and
   wherein the first text value is greater than the second text value.

14. The method according to claim 13, wherein the extracting the text comprises determining the first text value and the second text value according to following equations, respectively:

$$Th_{Bright} = HA - w * (HA - \text{Max}(HVUB, HVLB))$$

$$\left(\text{where, } w = \text{constant } K * \left(\frac{\delta}{\text{constant } R}\right)\right) \text{ and}$$

$$Th_{dark} = LA - w * (LA - \text{Min}(LVUB, LVLB))$$

$$\left(\text{where, } w = \text{constant } K * \left(\frac{\delta}{\text{constant } R}\right)\right),$$

where $Th_{bright}$ is the first text value,
$Th_{dark}$ is the second text value,
w is a weight value,
σ is a standard deviation of the subject area,
R is a constant representing a gray scale,
K is a constant between 0 and 1,
HA is the first average value,
LA is the second average value,
HVUB is the maximum brightness value in a first partial area of the plurality of partial areas,
HVLB is the maximum brightness value in a second first partial area of the plurality of partial areas,
LVUB is the minimum brightness value in the first partial area, and
LVLB is the minimum brightness value in the second first partial area.

15. A display apparatus comprising:
   a communicator configured to receive a recommendation channel map comprising channel numbers and channel information mapped to channel numbers from a server;
   a memory configured to store the recommendation channel map;
   a display configured to display the contents;
   a server configured to transmit the recommendation channel map; and
   a processor configured to update the recommendation channel map received from the server, by:
      receiving an input of a respective channel number,
      detecting second channel information of the content displayed in response to the input of the respective channel number,
      comparing the first channel information mapped to the respective channel number in the stored recommendation channel map with the second channel information,
      determining a mismatch between the first channel information and the second channel information, and
      updating the recommendation channel map to correspond with the second channel information,
   wherein the processor is further configured to control the communicator to transmit the updated recommendation channel map to the server.

16. The display apparatus of claim 15, wherein the processor is further configured to update the recommendation channel map to contain only the channel numbers mapped to the second channel information authorized to be reproduced by the display apparatus.

17. The display apparatus of claim 15, wherein the processor is further configured to detect the second channel information of the displayed content by detecting a text string being displayed as an overlay on the displayed content corresponding to a channel through which the content is received.

* * * * *